United States Patent
Kwak et al.

(10) Patent No.: US 8,630,360 B2
(45) Date of Patent: Jan. 14, 2014

(54) METHOD OF TRANSMITTING REFERENCE SIGNAL IN WIRELESS COMMUNICATION SYSTEM

(75) Inventors: Jin Sam Kwak, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 821 days.

(21) Appl. No.: 12/597,407

(22) PCT Filed: Apr. 28, 2008

(86) PCT No.: PCT/KR2008/002403
§ 371 (c)(1),
(2), (4) Date: Oct. 23, 2009

(87) PCT Pub. No.: WO2008/133467
PCT Pub. Date: Nov. 6, 2008

(65) Prior Publication Data
US 2010/0135360 A1    Jun. 3, 2010

(30) Foreign Application Priority Data

Apr. 26, 2007 (KR) .................. 10-2007-0041028

(51) Int. Cl.
*H04L 27/28* (2006.01)
*H04B 1/707* (2011.01)

(52) U.S. Cl.
USPC .......................... 375/260; 375/146

(58) Field of Classification Search
USPC ......... 375/295, 297, 259, 260, 130, 140, 146, 375/132, 135
See application file for complete search history.

(56) References Cited

U.S. PATENT DOCUMENTS

| | | | |
|---|---|---|---|
| 8,150,412 B2* | 4/2012 | Cheng et al. | 455/453 |
| 8,391,130 B2* | 3/2013 | Pi | 370/208 |
| 2005/0078737 A1* | 4/2005 | Craig et al. | 375/132 |
| 2005/0099939 A1 | 5/2005 | Huh et al. | |
| 2006/0013285 A1* | 1/2006 | Kobayashi et al. | 375/132 |
| 2007/0036068 A1* | 2/2007 | Cho et al. | 370/208 |
| 2008/0075195 A1* | 3/2008 | Pajukoski et al. | 375/298 |
| 2009/0052381 A1* | 2/2009 | Gorokhov et al. | 370/329 |

FOREIGN PATENT DOCUMENTS

| | | |
|---|---|---|
| EP | 1 478 150 A2 | 11/2004 |
| KR | 10-0578723 B1 | 5/2006 |

OTHER PUBLICATIONS

Kawamura et al., Layer 1 / Layer 2 Control Channel Structure in Single-Carrier FDMA Based Evolved UTRA Uplink, Vehicular Technology Conference, Apr. 2007, pp. 2941-2945.

* cited by examiner

*Primary Examiner* — Kevin M Burd
(74) *Attorney, Agent, or Firm* — Birch, Stewart, Kolasch & Birch, LLP

(57) ABSTRACT

A method of transmitting a reference signal in a wireless communication system includes generating a frequency-domain reference signal by performing discrete Fourier transform (DFT) on a time-domain reference signal, generating a transmit signal by performing inverse fast Fourier transform (IFFT) on the frequency-domain reference signal and transmitting the transmit signal.

4 Claims, 8 Drawing Sheets

Fig. 9
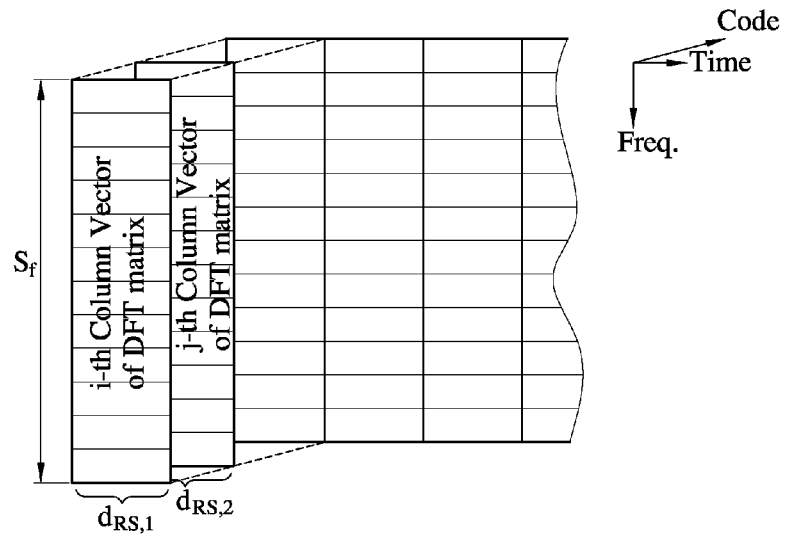
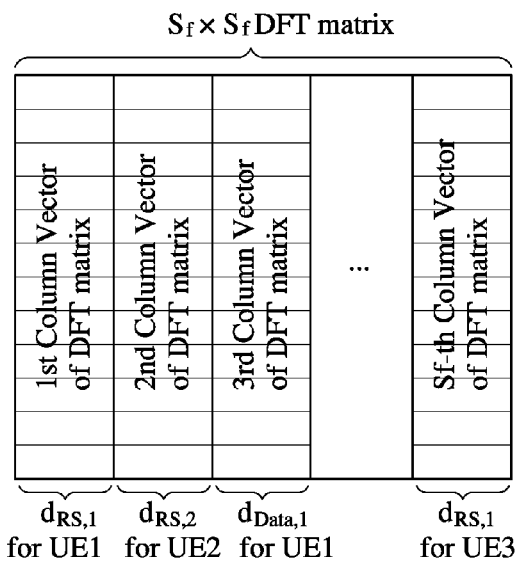
Fig. 10
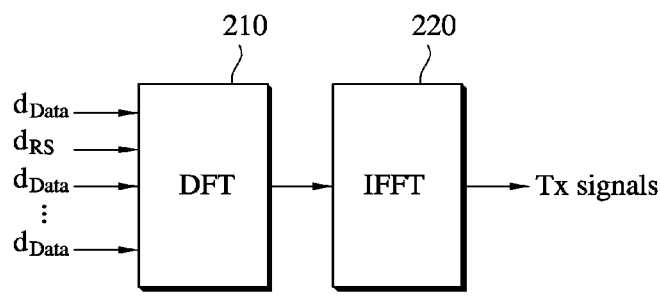

METHOD OF TRANSMITTING REFERENCE SIGNAL IN WIRELESS COMMUNICATION SYSTEM

TECHNICAL FIELD

The present invention relates to wireless communication, and more particularly, to a method for transmitting a reference signal in a wireless communication system.

BACKGROUND ART

In next generation multimedia mobile communication systems, which have been actively studied in recent years, there is a demand for a system capable of processing and transmitting a variety of information (e.g., video and packet data) in addition to the early-stage voice service. In order to maximize efficiency of a limited radio resource in a wireless communication system, methods for more effectively transmitting data in spatial and frequency domains have been provided.

Orthogonal frequency division multiplexing (OFDM) uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM, complexity of the receiver can be reduced in frequency selective fading environment of a broadband channel, and spectral efficiency can be increased when selective scheduling is performed in frequency domain by using channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multi-users.

To maximize efficiency in spatial domain, the OFDM/OFDMA-based system uses multi-antenna technique which is used as a suitable technique for high-speed multimedia data transmission by using a plurality of time and frequency resources in the spatial domain. The OFDM/OFDMA-based system also uses channel coding scheme for effective use of resources in time domain, scheduling scheme which uses channel selective characteristic among a plurality of users, hybrid automatic repeat request (HARM) scheme suitable for packet data transmission, etc.

Channel estimation needs to be reliable to ensure high-speed data transmission. It is important to design a reference signal, which is used for channel estimation, in order to increase the reliability of channel estimation. The reference signal is the signal known to both the transmitter and the receiver, and is also referred to as a pilot. A channel condition may vary depending on time and frequency. Therefore, the reference signal needs to be designed to cope with the channel condition flexibly, thereby increasing the reliability of channel estimation.

In general, the reference signal uses a fixed spreading code in time-frequency domain. Orthogonality of the spreading code is used to distinguish users. Since the reference signal is transmitted by using fixed radio resources, orthogonality between reference signals may be impaired when the channel condition changes rapidly. This may cause intra-cell interference or inter-cell interference. In this case, channel estimation may be inaccurate. If the same reference signal structure is used in a situation where channel characteristics of users are different from one another, it is difficult to increase the reliability of channel estimation. In addition, the reference signal has to be allocated in a flexible manner in order to increase a system capacity because the number of orthogonal codes is limited when a radio resource is limited and also because user accommodation capability is determined according to the number of available orthogonal codes.

Therefore, there is a need for a method for designing a reference signal in a flexible manner, whereby the user accommodation capability can be increased when radio resources are limited and whereby channel estimation and inter-cell interference can be effectively dealt with.

DISCLOSURE OF INVENTION

Technical Problem

A method is sought for transmitting a reference signal in a flexible manner by using time-frequency resources.

A method is also sought for allocating resources in various manners to a reference signal which is used in channel estimation for coherent detection. The present invention provides a reference signal structure in which the number of available users can be arbitrarily controlled by using the reference signal. The present invention also provides a reference signal structure which is more effective for inter-cell interference in a multi-cell environment to improve reliability of channel estimation.

Technical Solution

In an aspect, a method for transmitting a reference signal in a wireless communication system includes generating a frequency-domain reference signal by performing discrete Fourier transform (DFT) on a time-domain reference signal, generating a transmit signal by performing inverse fast Fourier transform (IFFT) on the frequency-domain reference signal and transmitting the transmit signal.

In another aspect, a method of transmitting data in a wireless communication system includes generating a frequency-domain reference signal and a frequency-domain data signal by performing discrete Fourier transform (DFT) on a reference signal and a data signal, generating a transmit signal by performing inverse fast Fourier transform (IFFT) on the frequency-domain reference signal and the frequency-domain data signal and transmitting the transmit signal.

Advantageous Effects

Reference signal structure can be designed for various environments and requirements by using downlink and/or uplink radio resources, and thus efficiency of the radio resources can increase. Further, a PAPR, which may be problematic in a conventional OFDM-based system, can be properly dealt with, and thus transmission can be achieved in the same manner as single carrier transmission. This can directly apply to an SC-FDMA structure.

BRIEF DESCRIPTION OF THE DRAWINGS

FIG. 9 shows a method for transmitting a reference signal in a frequency domain according to an embodiment of the present invention.

FIG. 10 is a block diagram showing a transmitter according to an embodiment of the present invention.

MODE FOR THE INVENTION

Figure 1:
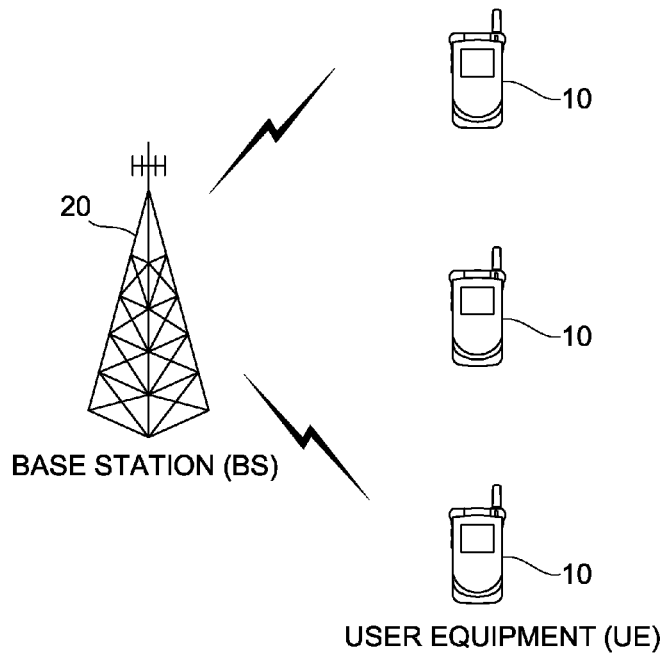
FIG. 1 shows a structure of a wireless communication system.

FIG. 1 shows a structure of a wireless communication system. The wireless communication system can be widely deployed to provide a variety of communication services, such as voices, packet data, etc.

Referring to FIG. 1, a wireless communication system includes a user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, downlink is defined as communication from the BS 20 to the UE 10, and uplink is defined as communication from the UE 10 to the BS 20. In the downlink direction, a transmitter may be a part of the BS 20, and a receiver may be a part of the UE 10. In the uplink direction, the transmitter may be a part of the UE 10, and the receiver may be a part of the BS 20.

Figure 2:
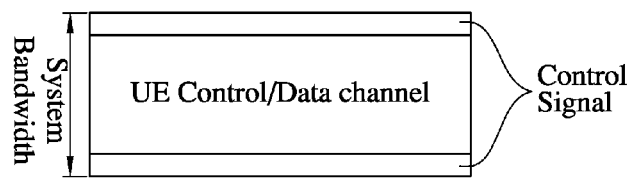
FIG. 2 shows an example of a sub-frame.

FIG. 2 shows an example of a sub-frame. The sub-frame includes a plurality of orthogonal frequency division multiplexing (OFDM) symbols in time domain and a plurality of subcarriers in frequency domain. A radio frame is composed of a plurality of sub-frames. For example, one radio frame may be composed of 10 sub-frames.

Referring to FIG. 2, a sub-frame is divided into two parts, i.e., a control region and a data region. The control region is used to carry a control signal on a control channel, and the data region is used to carry user data on a data channel. The control signal is used to indicate radio allocation of the data channel, channel condition and status of the data channel. Examples of the control signal include an acknowledgement (ACK)/not-acknowledgement (NACK) signal for hybrid automatic repeat request (HARQ), a channel quality indicator (CQI) to indicate channel condition, a precoding matrix index (PMI) to indicate a precoding matrix, a rank indicator (RI) to indicate a rank, etc. The control channel carries only the control signal. The data channel may carry both the user data and the control signal. Herein, overall bandwidth is divided into three parts so that two parts at both ends are assigned to the control region, and a middle part thereof is assigned to the data region. The control channel and the data channel have undergone frequency division multiplexing (FDM). However, this is only for exemplary purposes, and thus there is no limit in arrangement of the control channel and the data channel.

Figure 3:
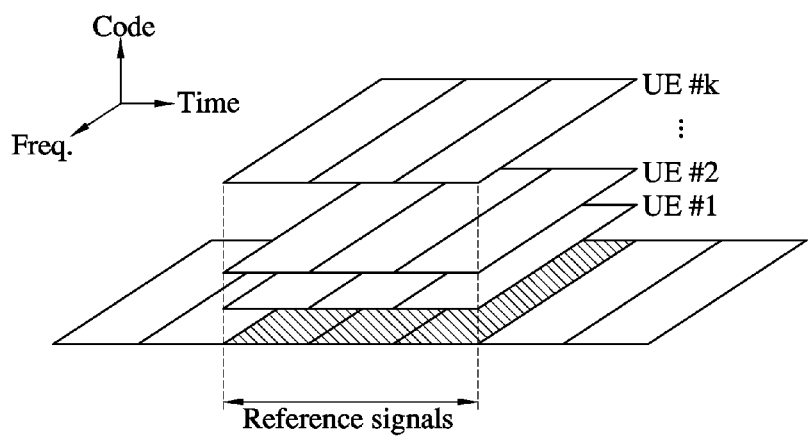
FIG. 3 shows an example of reference signal allocation in a control channel.

FIG. 3 shows an example of reference signal allocation in a control channel.

Referring to FIG. 3, reference signals are allocated over 3 OFDM symbols and 12 subcarriers. For a radio resource area of a pre-allocated reference signal, each UE is distinguished by using a spreading code in time and frequency domain. Neighboring cells are allocated with different spreading codes, thereby dispersing influence of inter-cell interference.

For example, it is assumed that a spreading code for a reference signal is used to achieve orthogonality by performing cyclic shift of a constant amplitude zero auto-correlation (CAZAC) sequence in frequency domain, and a discrete Fourier transform (DFT)-based spreading code is used in time domain. Orthogonality can be achieved between cells by changing a root index of the CAZAC sequence.

When the reference signal is transmitted by using limited radio resources, there is no way but to use a fixed spreading code in fixed time-frequency domain. The present inventive concept discloses various reference signal (RS) structures which effectively use time-frequency resources allocated to transmit the reference signal. A method for transmitting a reference signal by dividing allocated resources is disclosed by taking various examples.

Figure 4:
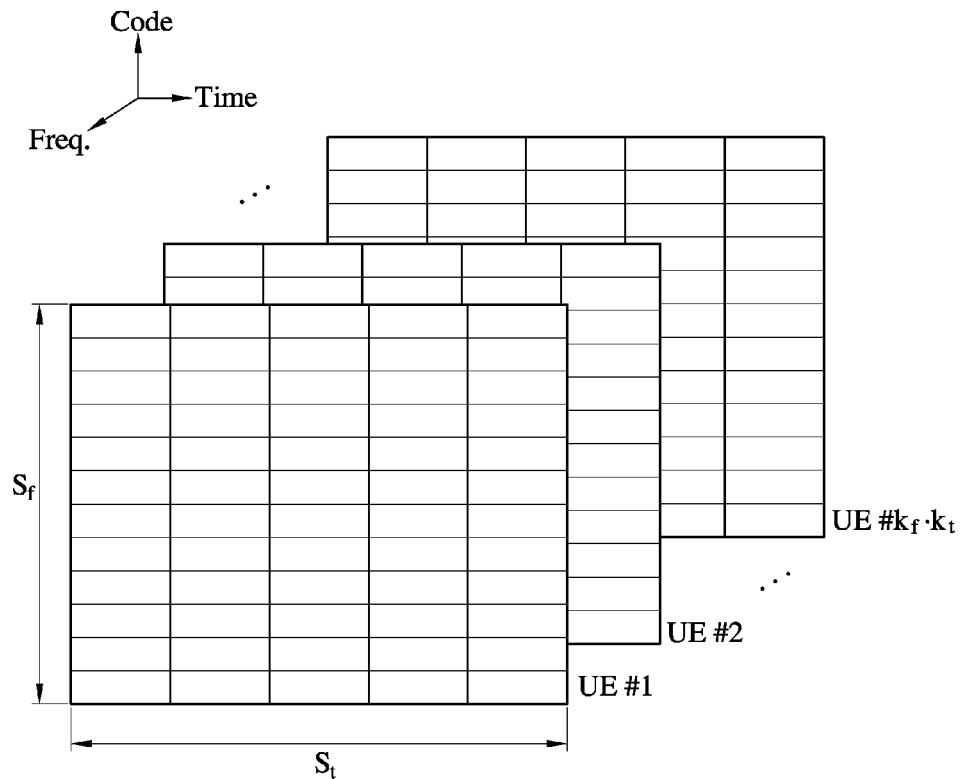
FIG. 4 shows an example of radio resource allocation for transmitting reference signals.

FIG. 4 shows an example of radio resource allocation for transmitting reference signals. Herein, radio resources are allocated in a control channel.

Referring to FIG. 4, two-dimensional radio resources composed of 5 OFDM symbols and 12 subcarriers are allocated to the reference signals. Hereinafter, Sf denotes a spreading factor (SF) in frequency domain, and St denotes an SF in time domain. In addition, Kf denotes the number of orthogonal spreading codes in the frequency domain, and Kt denotes the number of orthogonal spreading codes in the time domain. Independent Kf×Kt types of reference signals can be transmitted by using Sf×St two-dimensional radio resources. One two-dimensional radio resource used in transmission of the reference signals is referred to as a reference signal (RS) radio resource.

In an embodiment, the RS radio resource can be allocated to each UE so as to be used to distinguish UEs. When one RS radio resource is allocated to one UE, one cell can accommodate a maximum of Kf×Kt UEs. In another embodiment, reliability of channel estimation can be increased by allocating a plurality of the RS radio resources to the UEs. In still another embodiment, at least one RS radio resource which is independent in time/frequency domain can be allocated to a specific UE so as to make the reference signal robust under degraded orthogonality or be allocated to a specific cell so as to mitigate inter-cell interference. In still another embodiment, the plurality of the RS radio resources may be divided into a plurality of groups. In this case, RS radio resources belonging to a specific group may be allocated to a group of UEs having similar channel condition so that an RS structure suitable for the group can be used. Further, UEs may be arbitrarily allocated to each RS radio resource group so as to equalize influence of channel condition on a specific UE. Allocation of the RS radio resource group between cells can be used to mitigate inter-cell interference.

It is very important to ensure orthogonality of a spreading code when channel estimation is performed by using the reference signals. In a case where the reference signals are distinguished by performing spreading in the time domain and/or the frequency domain, if time or frequency selective fading channel characteristic changes rapidly in a specific UE, orthogonality degradation of the specific UE may give an effect on channel estimation capability of another UE.

Figure 5:
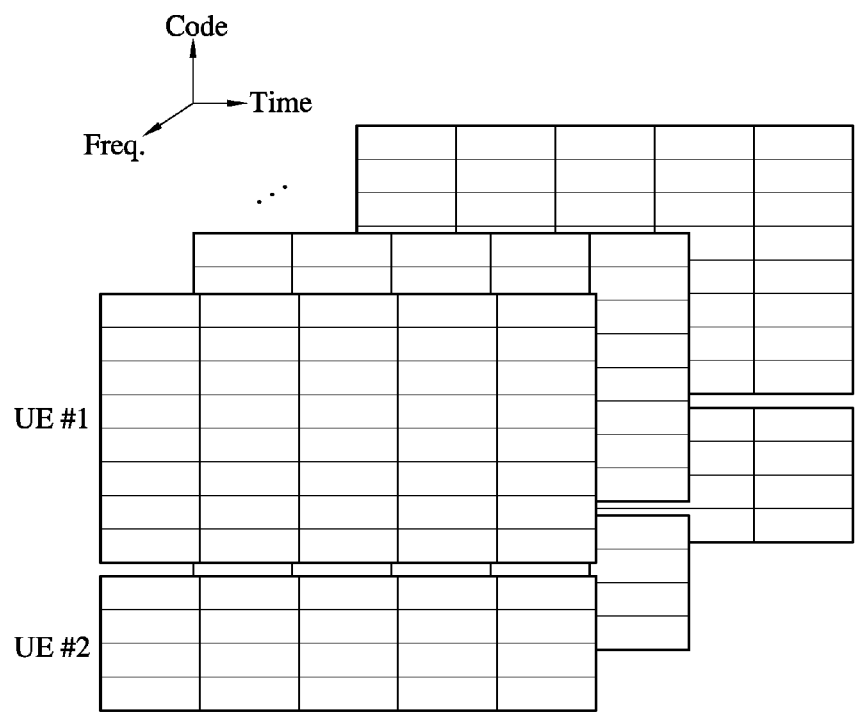
FIG. 5 shows another example of radio resource allocation for transmitting reference signals.

FIG. 5 shows another example of radio resource allocation for transmitting reference signals.

Referring to FIG. 5, radio resources are split in frequency domain, wherein the RS radio resource of FIG. 4 is regarded as a basic unit. The basic RS radio resource is split in the frequency domain to form a new RS radio resource. Accordingly, flexibility of code allocation can be ensured for each UE.

Figure 6:
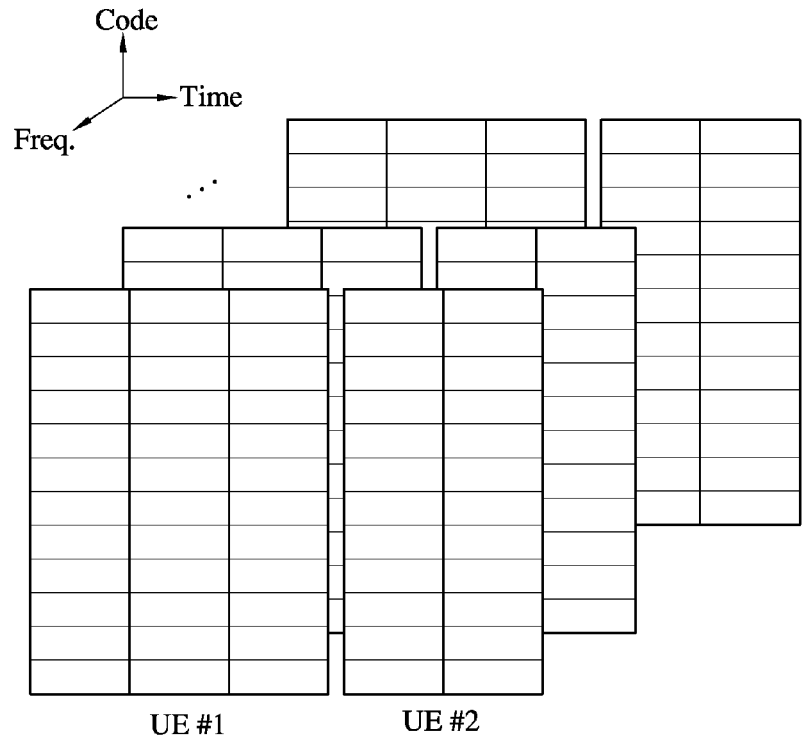
FIG. 6 shows another example of radio resource allocation for transmitting reference signals.

FIG. 6 shows another example of radio resource allocation for transmitting reference signals.

Referring to FIG. 6, radio resources are split in time domain, wherein the RS radio resource of FIG. 4 is regarded as a basic unit. The basic RS radio resource is split in the time domain to form a new RS radio resource. Accordingly, flexibility of code allocation can be ensured for each UE.

Figure 7:
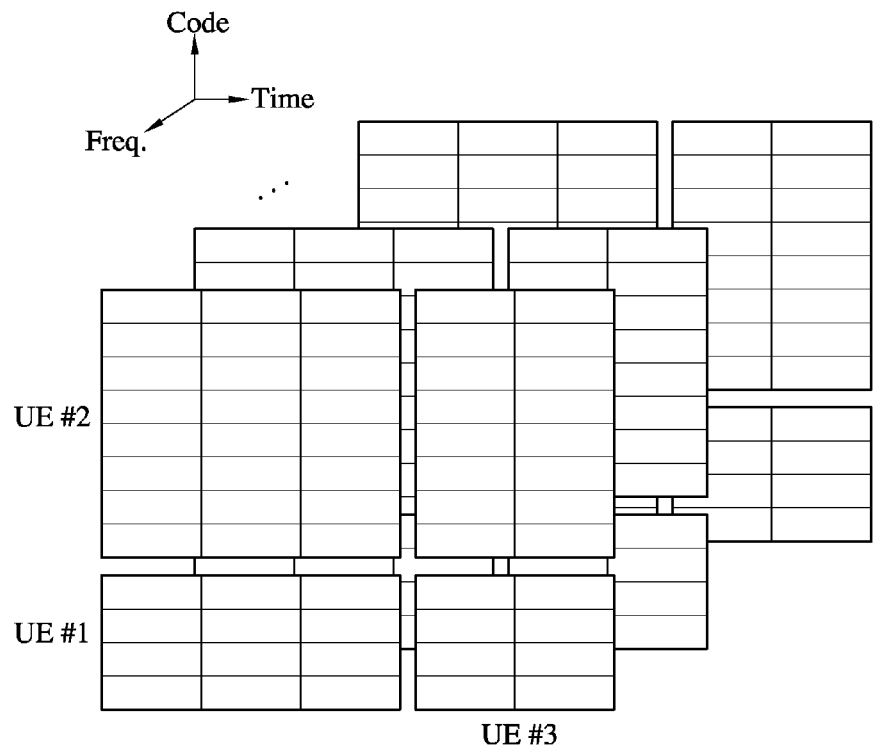
FIG. 7 shows another example of radio resource allocation for transmitting reference signals.

FIG. 7 shows another example of radio resource allocation for transmitting reference signals.

Referring to FIG. 7, radio resources are split in time-frequency domain, wherein the RS radio resource of FIG. 4 is regarded as a basic unit. The basic RS radio resource is split in the time-frequency domain to form a new RS radio resource. Accordingly, flexibility of code allocation can be ensured for each UE.

Figure 8:
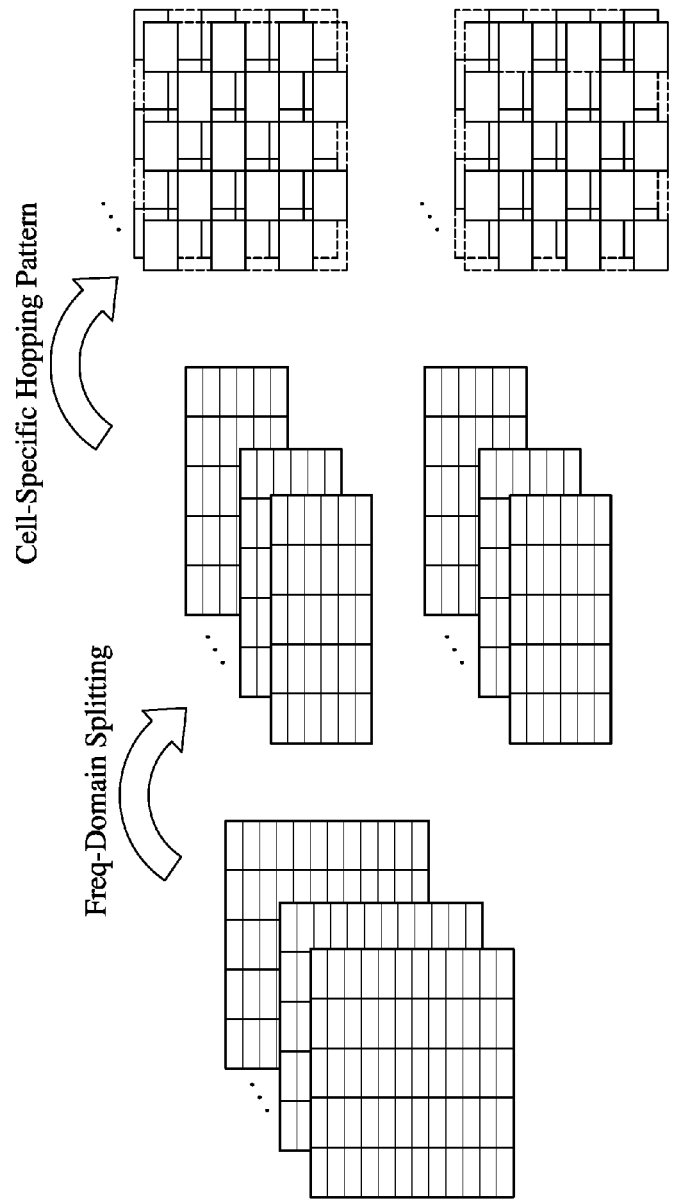
FIG. 8 shows another example of radio resource allocation for transmitting reference signals.

FIG. 8 shows another example of radio resource allocation for transmitting reference signals.

Referring to FIG. 8, radio resources are split in frequency domain, wherein the RS radio resource of FIG. 4 is regarded as a basic unit, and thereafter hopping is performed. The basic RS radio resource is split in the frequency domain and is then hopped so as to ensure additional flexibility and to equalize influence of inter-cell interference. In addition to a hopping pattern, a cell-specific scrambling code may also be used to obtain the same effect.

Although splitting and hopping in the frequency domain have been described herein, hopping and scrambling may apply for splitting in the time domain and splitting in the time-frequency domain.

FIG. 9 shows a method for transmitting a reference signal in frequency domain according to an embodiment of the present invention. This shows that the reference signal to be transmitted is code division multiplexed (CDM) in the frequency domain.

Referring to FIG. 9, an RS radio resource is defined as a column of a DFT matrix, and a reference signal is mapped by using a spreading code. The DFT matrix is an orthogonal matrix, and such a term does not limit the scope thereof. Each column of the DFT matrix can be used to distinguish UEs. A reference signal for one UE can be transmitted by using a plurality of columns.

When the reference signal is mapped, mapping is not limited to a radio resource area dedicatedly allocated for the reference signal, and thus the reference signal may also be used in data transmission. An example of a DFT matrix configured such that the reference signal has orthogonality for each UE in a code area is shown in an upper part of FIG. 9. An example of a DFT matrix configured such that the reference signal is transmitted along with data is shown in a lower portion of FIG. 9.

The aforementioned RS structure can be used in a control signal transmission method or a data signal transmission method using time or frequency domain spreading. In the case of frequency-domain CDM, a DFT column vector can be used as a spreading code. Assume that time-domain spreading is used for the purpose of: (a) distinguishing UEs in the same cell; (b) equalizing or reducing inter-cell interference; and (c) distinguishing a data signal and a reference signal, in a case where the data signal (i.e., control signal or user data) is transmitted using time-domain CDM. Then, spreading methods based on the DFT matrix can be mutually complemented as follows. For the purpose of (a), the UEs can be distinguished within the same symbol by allocating column vectors of different DFT matrices to the UEs and by using the allocated column vectors. For the purpose of (b), signals have to be distinguishable between cells in a CDM manner within the same resource. For this, the column vectors of the DFT matrix are allocated not to overlap between consecutive cells, thereby being able to reduce inter-cell interference. For the purpose of (c), when the data signal and the reference signal are simultaneously transmitted by one UE, each column vector of the DFT matrix is allocated, thereby being able to reduce influence of inter-signal interference.

According to the purposes of spreading, the spreading methods based on the DFT matrix can be combined so that a control channel can be effectively configured. By doing so, efficiency of a radio resource can be increased. For example, a spreading code in time domain may be used to distinguish UEs and to equalize inter-cell interference, and when the data signal and the reference signal are intended to be simultaneously transmitted in a frequency domain, each UE can configure a control channel of a data channel by using a DFT matrix in accordance with the number of allocated subcarriers.

In a method for spreading a reference signal in frequency domain, pseudo-noise (PN), an orthogonal code, or a specific sequence (e.g., CAZAC sequence) having an excellent correlation characteristic is directly transmitted by performing spreading in the frequency domain, and in this manner, independent signal processing can be performed. However, when the spreading of the control signal is limited to a time domain or when priority (e.g., distinguishing UE, equalizing inter-cell interference, etc.) is given to the spreading, or further, when UEs or cells are distinguished by using frequency division multiplexing (FDM), different spreading codes have to be used in a time-frequency domain due to a different RS structure and a different control signal transmission method. Therefore, a problem arises in that transmission efficiency of the control signal is limited. For example, when a spreading code is directly mapped in the frequency domain by using the same RS structure, an SF for control signal spreading in the time domain decreases as more radio resources are allocated for the reference signal, which has a direct effect on an accommodation capability of UE. Further, inter-cell interference is also affected. Accordingly, when the control signal is transmitted in the time domain in a CMD manner, there is a need for a method in which the control signal to be transmitted is effectively combined, instead of a method in which independent frequency-domain spreading is used to transmit a reference signal.

According to the present inventive concept, a spreading code used for a control signal is used when a reference signal is transmitted. Further, the spreading code is not affected as the number of reference signals are increased when the control signal is transmitted by using a time-domain CDM method. Furthermore, transmission efficiency of the control signal and throughput of the reference signal can be arbitrarily controlled.

FIG. 10 is a block diagram showing a transmitter according to an embodiment of the present invention.

Referring to FIG. 10, a transmitter includes a DFT unit 210 that performs DFT and an IFFT unit 220 that performs IFFT. The DFT unit 210 performs DFT on an input time-domain reference signal dRS and an input data signal dData, and outputs a frequency-domain reference signal and a frequency-domain data signal. The data signal dData may be a control signal and/or user data. The IFFT unit 220 performs IFFT on the received frequency-domain reference signal and the received frequency-domain data signal, and thus outputs Tx signals. The Tx signals are time-domain signals.

The DFT unit 210 may receive only the time-domain reference signal, or may receive both the time-domain reference signal and the data signal in parallel and/or series manners. Although it has been described that one time-domain reference signal is input between two data signals, arrangement between the data signal and the time-domain reference signal is not limited thereto. The time-domain reference signal and the data signal may be input in a locally concentrated manner or may be input in a spreading manner with a specific interval.

Figure 11:
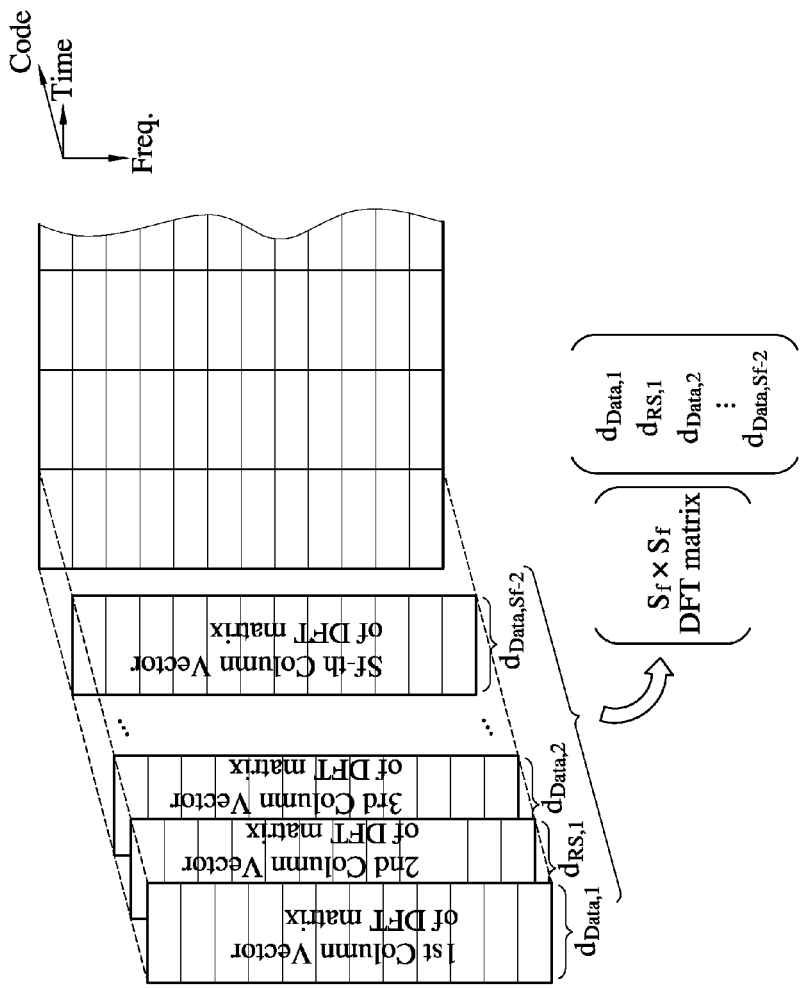
FIG. 11 shows transmission of a reference signal by using the transmitter of FIG. 10.

FIG. 11 shows transmission of a reference signal by using the transmitter of FIG. 10.

Referring to FIG. 11, in order to transmit a data signal and a reference signal, column vectors of a DFT matrix are allocated to codes for transmitting the data signal and the reference signal. When the signals are transmitted in the form of OFDM symbols by using a DFT matrix having a specific size (i.e., the number of subcarriers to be used), the same structure as a general single carrier-frequency division multiplexing (SC-FDM) structure is used, which is advantageous to reduce a peak-to-average power ratio (PAPR).

This can be easily applied to a system based on the SC-FDMA (single carrier-frequency division multiple access) structure. In particular, it is possible to solve a problem in which a reference signal is independently allocated in a frequency domain and which occurs when a data signal is transmitted by using time-domain spreading. Thus, there is an advantage in that efficiency of a limited radio resource can be more improved than when a frequency-domain data signal is transmitted.

For example, time-domain spreading may be used to distinguish UEs and to reduce inter-cell interference. In addition, when a data signal and a reference signal are transmitted base on DFT, data transmission may be performed by pre-determining the number of reference signals suitable for coherent transmission.

Figure 12:
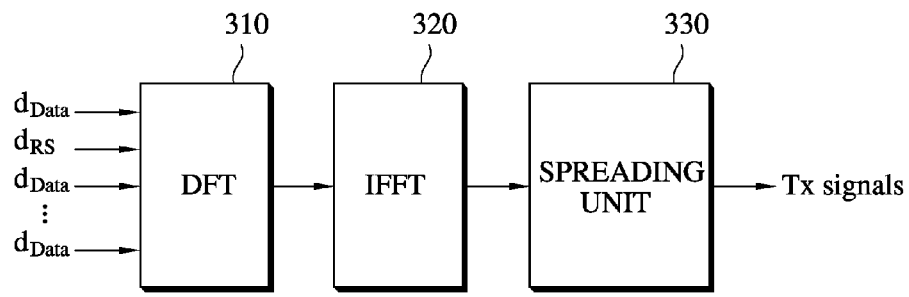
FIG. 12 is a block diagram of a transmitter according to another embodiment of the present invention.

FIG. 12 is a block diagram of a transmitter according to another embodiment of the present invention.

Referring to FIG. 12, a transmitter includes a DFT unit 310, an IFFT unit 320, and a spreading unit 330. The DFT unit 310 performs DFT on an input time-domain reference signal $d_{RS}$ and an input data signal $d_{Data}$, and outputs a frequency-domain reference signal and a frequency-domain data signal. The data signal $d_{Data}$ may be a control signal and/or user data. The IFFT unit 320 performs IFFT on the received frequency-domain reference signal and the received frequency-domain data signal, and thus outputs Tx signals. The Tx signals are time-domain signals. The spreading unit 330 spreads the Tx signals by using a spreading code so that the Tx signals can be distinguished between UEs or between cells.

Figure 13:
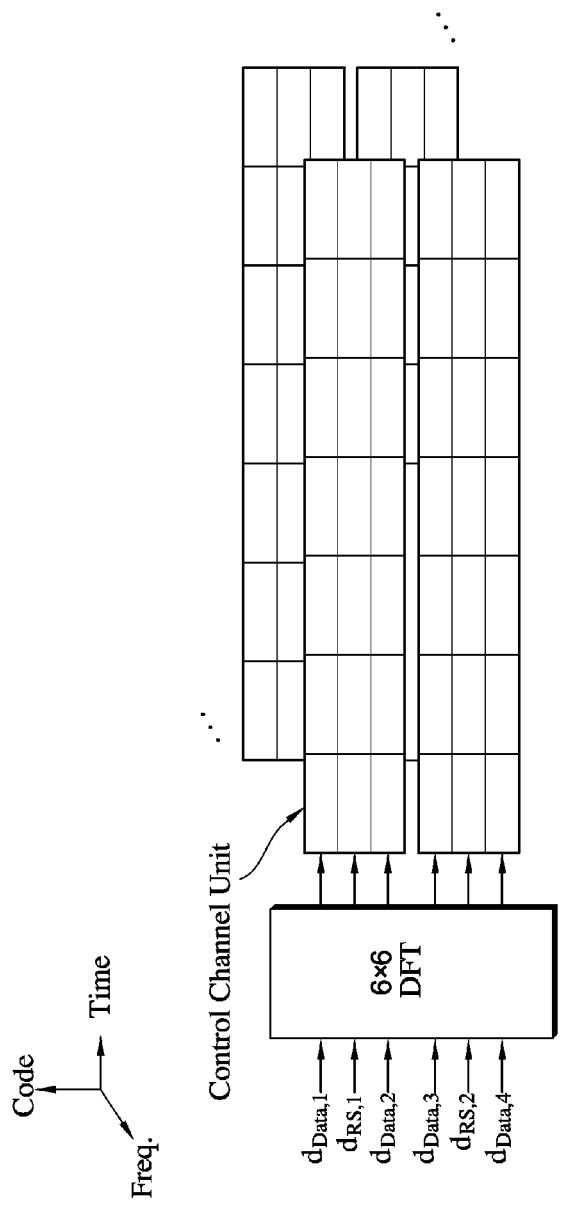
FIG. 13 shows an example of transmission of a control signal by using the transmitter of FIG. 12.

FIG. 13 shows an example of transmission of a control signal by using the transmitter of FIG. 12.

Referring to FIG. 13, three subcarriers are grouped to form one control channel unit. The control channel unit includes one reference signal and two data signals. Time-domain spreading uses a CAZAC sequence having a length of seven and using seven symbols. When two control channel units are allocated to a specific UE, two reference signals $d_{RS,1}$ and $d_{RS,2}$ and four data signals $d_{Data,1}$, $d_{Data,2}$, $d_{Data,3}$, $d_{Data,4}$ can be transmitted by using a 6×6 DFT matrix. Although different control channel units are allocated, each UE can be distinguished by performing cyclic shift of the CAZAC sequence used in a time domain. Influence of inter-cell interference can be reduced between consecutive cells by using indices of different CAZAC sequences.

In the aforementioned RS structure, the number of reference signals increases in proportion to the number of control channel units used by an actual UE. Thus, it can be expected that reliability of channel estimation increases. This can be applied irrespective of a size of radio resource allocated for data transmission. In addition, a plurality of UEs can be supported by using frequency domain division, time domain division, time-frequency domain division, etc. When data is transmitted by using two control channel units, seven CAZAC sequences can be cyclic-shifted by using four reference signals and block-level spreading, thereby generating a symbol capacity amounting to a total of 56 symbols. This results in increase in transmission capacity by 56% in comparison with symbol capacity amounting to 36 symbols in frequency domain.

Downlink and/or uplink radio resources can be designed for various environments and requirements, and thus efficiency of the radio resources can be increased. Channel estimation can be effectively performed by using a proposed RS structure. A resource can be flexibly allocated for a reference signal when a control channel or a data channel is designed. The reference signal can be selectively used according to channel environment and mobility. As the number of spreading codes increases, accommodation capability of UE increases, and inter-cell interference is mitigated. In particular, when the control signal is transmitted under the requirement that reliability is important, it is possible to effectively use flexible arrangement of the reference signal.

A PAPR may be problematic in a conventional OFDM-based system, but this problem can be solved in the present invention, and thus transmission can be achieved in the same manner as single carrier transmission. This can be directly used in the SC-FDMA structure.

Figure 14:
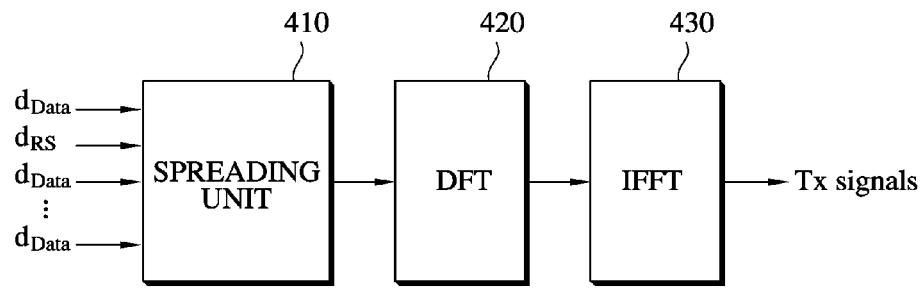
FIG. 14 is a block diagram of a transmitter according to another embodiment of the present invention.

FIG. 14 is a block diagram of a transmitter according to another embodiment of the present invention.

Referring to FIG. 14, a transmitter includes a spreading unit 410, a DFT unit 420, and an IFFT unit 430. The spreading unit 410 spreads an input time-domain reference signal dRS and an input data signal dData by using an arbitrary spreading code so as to distinguish UEs and/or cells. The DFT unit 420 performs DFT on the received signals and outputs frequency-domain signals. The IFFT unit 430 performs IFFT on the received frequency-domain signals and outputs Tx signals. The Tx signals are time-domain signals.

Figure 15:
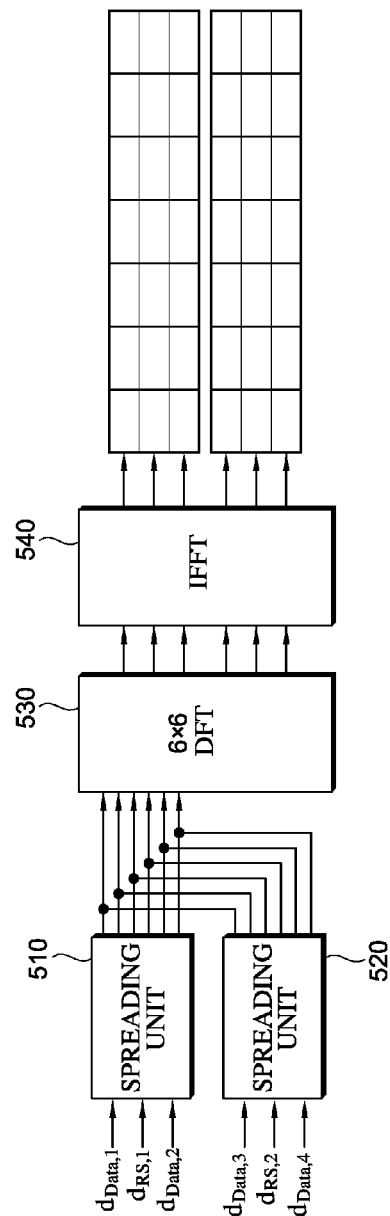
FIG. 15 shows transmission of a reference signal by using the transmitter of FIG. 14.

FIG. 15 shows transmission of a reference signal by using the transmitter of FIG. 14.

Referring to FIG. 15, a control channel includes 6 subcarriers and 7 OFDM symbols. The transmitter includes a first spreading unit 510, a second spreading unit 520, a DFT unit 530, and an IFFT unit 540. The first spreading unit 510 spreads a time-domain reference signal $d_{RS,1}$ and time-domain data signals $d_{Data,1}$ and $d_{Data,2}$ for a first UE by using an arbitrary spreading code (e.g., a first Walsh code), and outputs a first spreading signal. The second spreading unit 520 spreads a time-domain reference signal $d_{RS,2}$ and data signals $d_{Data,3}$ and $d_{Data,4}$ for a second UE by using an arbitrary spreading code (e.g., a second Walsh code), and outputs a second spreading code. The DFT unit 530 performs DFT on the received first and second spreading signals and outputs frequency-domain signals. The IFFT unit 540 performs IFFT on the received frequency-domain signals and outputs Tx signals.

Figure 16:
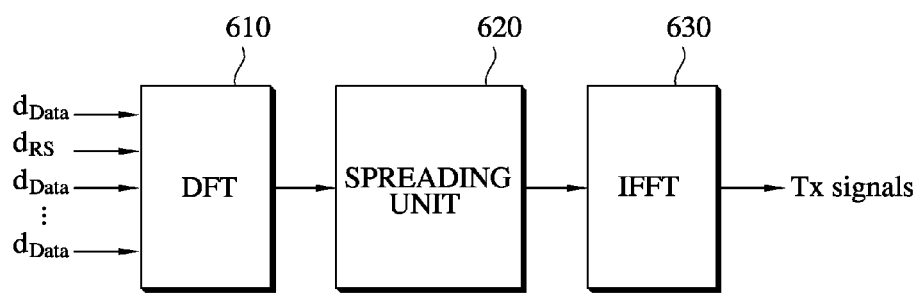
FIG. 16 is a block diagram of a transmitter according to another embodiment of the present invention.

FIG. 16 is a block diagram of a transmitter according to another embodiment of the present invention.

Referring to FIG. 16, the transmitter includes a DFT unit 610, a spreading unit 620, and an IFFT unit 630. The DFT unit 610 performs DFT on an input time-domain reference signal $d_{RS}$ and an input data signal $d_{Data}$, and outputs frequency-domain signals. The spreading unit 620 spreads the frequency-domain signals by using an arbitrary spreading code so that UEs and/or cells can be distinguished. The IFFT unit 630 performs IFFT on the spread frequency-domain signals and outputs Tx signals.

Reference signal structure can be designed for various environments and requirements by using downlink and/or uplink radio resources, and thus efficiency of the radio resources can increase. Further, a PAPR, which may be problematic in a conventional OFDM-based system, can be properly dealt with, and thus transmission can be achieved in the same manner as single carrier transmission. This can directly apply to an SC-FDMA structure.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting a reference signal by a user equipment (UE) in a wireless communication system, the method comprising:

generating, by the UE, an uplink reference signal in a subframe, the uplink reference signal used by a base station to demodulate a hybrid automatic repeat request (HARQ) ACK/NACK signal of the UE, the subframe comprising a plurality of orthogonal frequency division multiplexing (OFDM) symbols in time domain and a plurality of subcarriers in frequency domain; and transmitting, by the UE to the base station, the uplink reference signal only in a first set of the OFDM symbols of the subframe; and transmitting, by the UE to the base station, the HARQ ACK/NACK signal only in a second set of the OFDM symbols of the subframe different from the first set of the OFDM symbols of the subframe, wherein the step of generating the uplink reference signal includes:

determining a sequence group from a plurality of frequency sequence groups based on a cell specific hopping parameter;

determining a basic frequency spreading sequence based on the determined sequence group;

generating a frequency spreading sequence by cyclically shifting the determined basic frequency spreading sequence; and generating the uplink reference signal by spreading the frequency spreading sequence only over the first set of the OFDM symbols with an orthogonal spreading code.

2. The method of claim 1, wherein the number of the plurality of subcarriers of the subframe is 12 and the number of OFDM symbols in the first set of OFDM symbols is 3.

3. The method of claim 2, wherein the OFDM symbols in the first set of OFDM symbols are consecutive.

4. A device for transmitting a reference signal in a wireless communication system, the device comprising:

a transmitter having a spreading unit configured to:

generate an uplink reference signal in a subframe, the uplink reference signal used by a base station to demodulate a hybrid automatic repeat request (HARQ) ACK/NACK signal, the subframe comprising a plurality of orthogonal frequency division multiplexing (OFDM) symbols in time domain and a plurality of subcarriers in frequency domain; and transmit the uplink reference signal only in a first set of the OFDM symbols of the subframe; and transmit the HARQ ACK/NACK signal only in a second set of the OFDM symbols of the subframe different from the first set of the OFDM symbols of the subframe, wherein the transmitter is configured to generate the uplink reference signal by:

determining a sequence group from a plurality of frequency sequence groups based on a cell specific hopping parameter;

determining a basic frequency spreading sequence based on the determined sequence group;

generating a frequency spreading sequence by cyclically shifting the determined basic frequency spreading sequence; and generating the uplink reference signal by spreading the frequency spreading sequence only over the first set of the OFDM symbols with an orthogonal spreading code.

\* \* \* \* \*